(12) United States Patent
Morris

(10) Patent No.: US 6,406,064 B1
(45) Date of Patent: Jun. 18, 2002

(54) POSITIVE LOCKING DEVICE FOR REACTOR INSTRUMENTATION PROTECTION SLEEVE ASSEMBLY

(75) Inventor: Richard W. Morris, East Granby, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/433,304

(22) Filed: Nov. 3, 1999

(51) Int. Cl.[7] ................................................ F16L 35/00
(52) U.S. Cl. ......................... 285/92; 376/204; 376/245; 376/254; 376/255; 376/203; 403/204
(58) Field of Search ................................. 376/203, 204, 376/205, 245, 254, 255; 403/204; 285/92

(56) References Cited

U.S. PATENT DOCUMENTS

| | | | | |
|---|---|---|---|---|
| 225,626 A | * | 3/1880 | Melendy | |
| 250,195 A | * | 11/1881 | Booraem | |
| 3,200,044 A | * | 8/1965 | Long | |
| 4,012,282 A | * | 3/1977 | Hutter et al. | 376/245 |
| 4,174,123 A | * | 11/1979 | Schluderberg | 285/47 |
| 4,420,456 A | * | 12/1983 | Nickel et al. | 376/245 |
| 4,773,799 A | * | 9/1988 | Guironnet | |
| 4,881,760 A | * | 11/1989 | Runkles et al. | |
| 5,015,014 A | * | 5/1991 | Sweeney | |
| 5,215,336 A | * | 6/1993 | Worthing | |
| 5,263,060 A | * | 11/1993 | Obermeyer | 376/254 |
| 5,513,227 A | * | 4/1996 | Margotta et al. | 376/203 |
| 5,619,546 A | * | 4/1997 | Porter et al. | |
| 5,785,544 A | * | 7/1998 | Morris | |
| 5,828,711 A | * | 10/1998 | Malmasson | 276/204 |
| 5,829,104 A | * | 11/1998 | Gay et al. | 24/71 J |

FOREIGN PATENT DOCUMENTS

| | | | | |
|---|---|---|---|---|
| DE | DAS 1294744 | * | 5/1969 | |
| EP | 0346170 | * | 12/1989 | |
| EP | 0393367 | * | 10/1990 | |
| GB | 2265249 A | * | 9/1993 | G21C/17/10 |

* cited by examiner

*Primary Examiner*—Michael J. Carone
*Assistant Examiner*—John Richardson

(57) ABSTRACT

A locking device for a reactor instrumentation protective sleeve and reactor instrumentation column assembly. The locking device includes a protective sleeve coupled to the instrumentation column by a selectively operable and closeable clip assembly. The locking device also includes a locking sleeve supported by the protective sleeve. The locking sleeve is supported by the protective sleeve such that a portion of the locking sleeve covers a portion of the protective sleeve and the clip assembly.

1 Claim, 5 Drawing Sheets

POSITIVE LOCKING DEVICE FOR REACTOR INSTRUMENTATION PROTECTION SLEEVE ASSEMBLY

BACKGROUND OF THE INVENTION

1. Field of the Invention

The present invention relates generally to a device for securing a protective sleeve onto a core exit thermocouple instrumentation ("CET") column. More particularly, the present invention relates to a locking sleeve coupled to a reactor instrumentation protective sleeve, wherein the locking sleeve covers at least a portion of a clip assembly that couples the protective sleeve to the CET column.

2. Description of Related Art

During the assembly and reassembly of a commercial pressurized water reactor nuclear reactor vessel, it is necessary to protect the CET instrumentation leads. To provide this protection, these instrumentation leads are typically housed in a protective sleeve, conventionally known in the art as a "bullet nose assembly." This protective sleeve is secured such that it is not removed with the reactor closure during disassembly. Typically the protective sleeve is secured to the CET instrumentation column using either a retaining ring or a spring-loaded C-shaped clip hinged at one end and selectively operable and closeable at the opposite end.

FIG. 1 shows and example of a prior art device. The locking device 1 includes a protective sleeve 2, a retaining ring or clip assembly 4 and a CET column 6.

The protective sleeve 2 is a cylindrically shaped member having an open center. The protective sleeve 2 also includes an annular groove 3 in its outer periphery. The annular groove 3 includes one or more apertures (not shown). The protective sleeve 2 is typically constructed from several open center cylindrical elements welded together to form the protective sleeve.

As seen in FIG. 1, the CET column 6 is a cylindrically shaped element having first and second ends. The first end (not shown) is fastened to the reactor vessel internals approximately ten feet below the protective sleeve 2. The second end 8 is the exit point for the CET instrumentation leads 7.

The CET instrumentation leads 7 are typically a plurality of 12 or 13 tubes containing CETs that extend vertically from a horizontal plane near the top of the CET column 6. The instrumentation leads 7 extend approximately 1 to 4 feet vertically above the second end 8 of the CET column 6. The lengths of the instrumentation leads 7 for a particular CET column 6 are staggered in this length range to permit the reception of the protective sleeve 2. These instrumentation leads 7 are terminated with electrical connectors (not shown). For installation of the protective sleeve 2, it is necessary to disconnect the instrumentation leads 7 from their associated field cabling.

The protective sleeve 2 has two ends. One end has an open center that first receives the disconnected instrumentation leads 7 and then the fixed diameter of the CET column 6. This end of the protective sleeve is where the retaining ring or clip assembly 4 is located. The other end of the protective sleeve 2 is terminated with a conical end fitting (not shown). This conical end fitting permits the protective sleeve 2 to be received by the reactor vessel closure during reactor reassembly. The overall length of the protective sleeve 2 is sized such that the instrumentation leads 7 can be received and housed by the open center of the protective sleeve 2 without being vertically challenged.

The retaining ring or clip assembly 4 couples the protective sleeve 2 and the CET column 6 together. The retaining ring or clip assembly 4 may be a spring-loaded C-shaped member having two legs hingedly coupled together and the free ends releasably joined together. Typically, a mechanical fastener such as a spring-loaded detent is used to join the free ends of the clip.

In a conventional set up, the retaining ring or clip assembly 4 is installed in the annular groove 3 defined by the protective sleeve 2 so as to mechanically engage the CET column 6. This arrangement locks the protective sleeve 2 in position on the CET column 6.

Undesirable mechanical interferences, debris or other objects falling onto the retaining ring or clip assembly 4 may cause the spring-loaded detent to become disengaged from the protective sleeve 2. The disengagement of the retaining ring or clip assembly 4 from the protective sleeve 2 may result in significant damage to the instrumentation leads, increased radiation exposure to personnel involved with the evaluation and repair of the instrumentation leads and significant delays in outage evolution. The resultant evaluations, delays and repair work alone may add hundreds of thousands of dollars to reactor maintenance costs.

Additionally, the retaining ring or clip assembly 4 is small enough that it may fall into the reactor vessel, thus, resulting in the introduction of foreign material into the reactor vessel internals. All foreign material is closely monitored and must be removed from the internal of the reactor vessel to avoid significant damage to the operating system.

Finally, the existing protective sleeve 2 design permits installation of the retaining ring or clip assembly 4 onto the CET column 6 in only one orientation. In some instances, the retaining ring or clip assembly 4 has been installed in an orientation that prevents it from fully engaging the CET column 6. This lack of full engagement may result in disengagement of the retaining ring or clip assembly 4 from the protective sleeve 2, resulting in significant damage to the operating system.

Therefore, there is needed a locking device which permits the retaining ring or clip assembly 4 to be installed in a plurality of orientations and which helps maintain the retaining ring or clip assembly 4 in the locked position until intentionally disengaged.

SUMMARY OF THE PRESENT INVENTION

This invention relates to a locking device. In the preferred embodiment, the locking device is used in a nuclear power plant to provide a barrier surface over a clip assembly used to couple the protective sleeve to a core exit thermocouple column.

The locking device includes a protective sleeve and a locking sleeve supported by the protective sleeve. The protective sleeve defines an annular groove in the outer periphery thereof having apertures alternately spaced between vertically extending fingers. The protective sleeve also includes threads supported by its outer periphery.

The protective sleeve is received over the CET column to help prevent damage to the CET column instrumentation leads. A clip assembly is used to couple the protective sleeve to the CET column.

The clip assembly includes two legs hingedly coupled together at one end and releasably joined at the opposite end. Each leg supports at least one inwardly projecting raised surface contoured to engage an annular groove in the outer periphery of the CET column. During installation, the clip assembly is received in the annular groove defined by the protective sleeve.

The locking sleeve is a cylindrically shaped member, and is received over the clip assembly. The locking sleeve is coupled to the protective sleeve such that it covers at least a portion of the protective sleeve. The locking device includes threads supported by the internal surface thereof for mating with the threads of the protective sleeve.

In another embodiment, the invention relates to a locking device for a reactor instrumentation protection sleeve and instrumentation column assembly joined by a selectively openable and closable clip. The locking device includes a protective sleeve having an elongated body supporting a first set of threads on at least a portion of the outer perimeter thereof and a locking sleeve having an elongated body supporting a second set of threads on the interior surface thereof for mating with the first set of threads, whereby the locking sleeve is adapted to cover at least a portion of the protective sleeve once the first set of threads and the second set of threads are engaged.

In still another embodiment, the combination of the locking device and an instrumentation column protective sleeve includes an instrumentation column; a protective sleeve surrounding the outer perimeter of a portion of the instrumentation column; a clip assembly supported by the protective sleeve, wherein the clip assembly couples the instrumentation column and protective sleeve together; and a locking sleeve supported by the protective sleeve, the locking sleeve being coupled to the protective sleeve such that the locking sleeve is adapted to cover at least a portion of the clip assembly and the protective sleeve.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENTS

Figure 1:
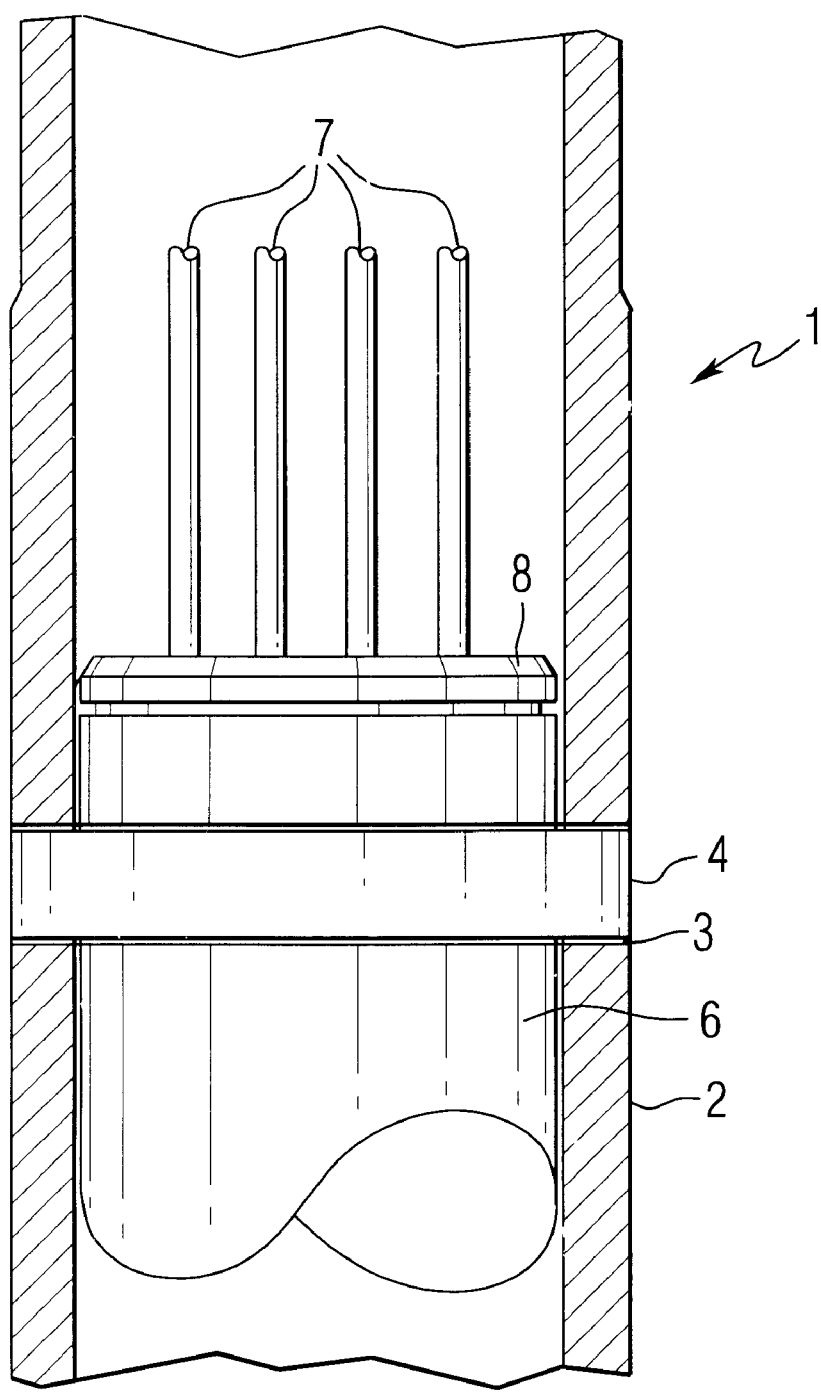
FIG. 1 shows a typical prior art assembly of a protective sleeve and a core exit thermocouple instrumentation column.
Figure 2A:
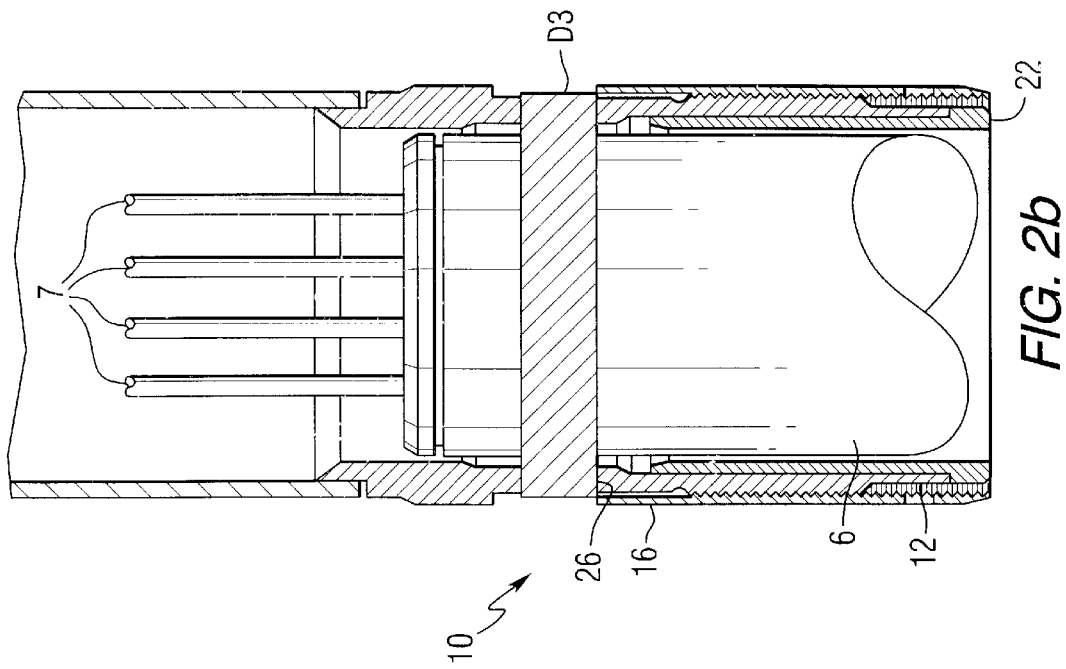
FIGS. 2a and 2b show an assembly view of a first embodiment of a positive locking device for a reactor instrumentation column protective sleeve, in the locked and unlocked positions, respectively.
Figure 2B:
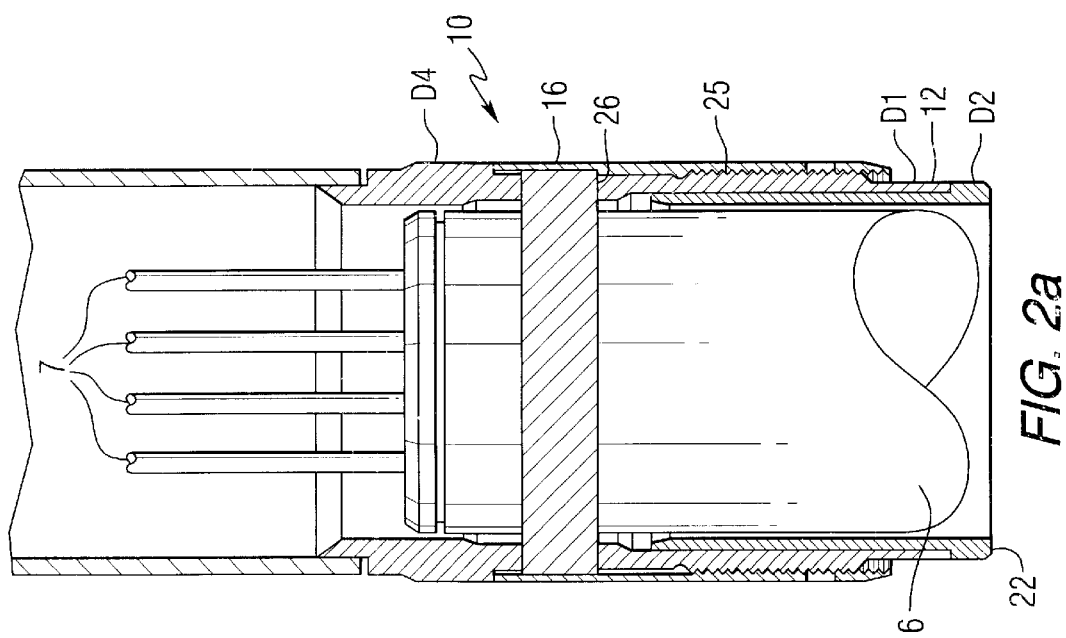

FIGS. 2 through 5 show a locking device 10 formed in accordance with the teachings of this invention. The locking device 10 includes a protective sleeve 12 and locking sleeve 16. In FIGS. 2 and 3, the locking device 10 is shown installed on a conventional CET column 6 assembly, with the protective sleeve 12 covering the instrumentation leads 7. However, the present invention is not limited to this environment or field of use and, as would be clear to the ordinarily skilled artisan, can be used to protect instrumentation in sundry technical applications.

Turning now to a discussion of the elements of the locking device 10, the protective sleeve 12 includes a lower portion 18, an upper portion 20 and an annular groove 26. It will be appreciated that the protective sleeve 12 may either be formed as a unitary member or formed as separate components coupled together using conventional techniques. The preferred material from which to fabricate the protective sleeve 12 is a stainless steel. It will be appreciated that other materials having similar mechanical and corrosion resistant properties may be used.

The lower portion 18 has a cylindrically shaped body having a depending sidewall portion 23. The outer periphery of the sidewall portion 23 may support screw threads 25. The lower portion 18 also defines an open center 21.

An ultra-high molecular weight polyethylene insert 22, having a configuration similar to that of the lower portion 18, is received in the open center 21. The insert 22 includes a sidewall portion that is contiguous with the sidewall portion 23 of the lower portion 18. The bottom surface of the insert 22 extends beyond and rests on the bottom surface of the lower portion 18. This arrangement is, of course, non-limiting and, depending upon the application, the device can be designed in various configurations.

The upper portion 20 also has a cylindrically shaped body having a depending sidewall portion 27. The sidewall portion 27 surrounds an open center. The lower portion 18 has a diameter D1, which is substantially identical to the diameter D2 of the insert 22 and the diameter D3 of the clip assembly 14, when the clip assembly 14 is fully installed in the annular groove 26. The outside diameter D5 of the locking sleeve 16 is substantially identical to the diameter D4. This provides for a smooth transition, to permit the reactor head closure to receive the protective sleeve 12 and locking device 10.

The annular groove 26 is interposed between the lower portion 18 and the upper portion 20. The annular groove 26 surrounds an open center, and supports a plurality of vertically extending fingers 28. The fingers 28 extend between, and are integrally formed with, both the lower portion 18 and the upper portion 20. The fingers 28 are spaced around the annular groove 26 and are disposed alternately between apertures 29 also included in the annular groove 26. The number of fingers 28 and apertures 29 are established to coincide with the number of inwardly projecting surfaces 36 (discussed further below) on the clip assembly 14. The number and spacing of each can be established by the skilled artisan based on myriad design choices, but in the preferred embodiment the number is four and the spacing is equidistant.

Turning now to a discussion of the locking sleeve 16, the locking sleeve 16 includes a cylindrically shaped body surrounding an open center 32. The locking sleeve 16 may also include internal threads 34 around its inner perimeter. Preferably, the locking sleeve 16 is fabricated of Nitronic 60 steel or a stainless steel. It will be appreciated that other materials having similar properties may be used.

In the preferred embodiment, the locking sleeve 16 is threaded onto the protective sleeve 12. The locking sleeve 16 is sized such that the threaded interior portion 34 engages the threaded outer periphery 25 of protective sleeve 12. As the locking sleeve 16 is threaded onto the protective sleeve 12, a portion of the protective sleeve is received in the open center 32 of the locking sleeve 16.

A locking device 10 of the type described herein can be used in a nuclear power plant during installation and removal of a reactor head. When used in this environment, the locking sleeve 16 and the protective sleeve 12 are assembled onto a core exit thermocouple ("CET") instrumentation column 6. The clip 14, having projecting surfaces 36 which mechanically engage the CET column, couples the protective sleeve 12 to the CET column 6. Thus, the locking sleeve 16 provides a barrier surface over the clip 14 to help prevent debris or other objects from falling onto the clip 14, and causing inadvertent disengagement of the clip 14 due to the impact of the debris or other objects on the clip 14.

Preferably, the clip 14 is fabricated of a stainless steel. However, other materials having similar properties may be used.

Figure 4:
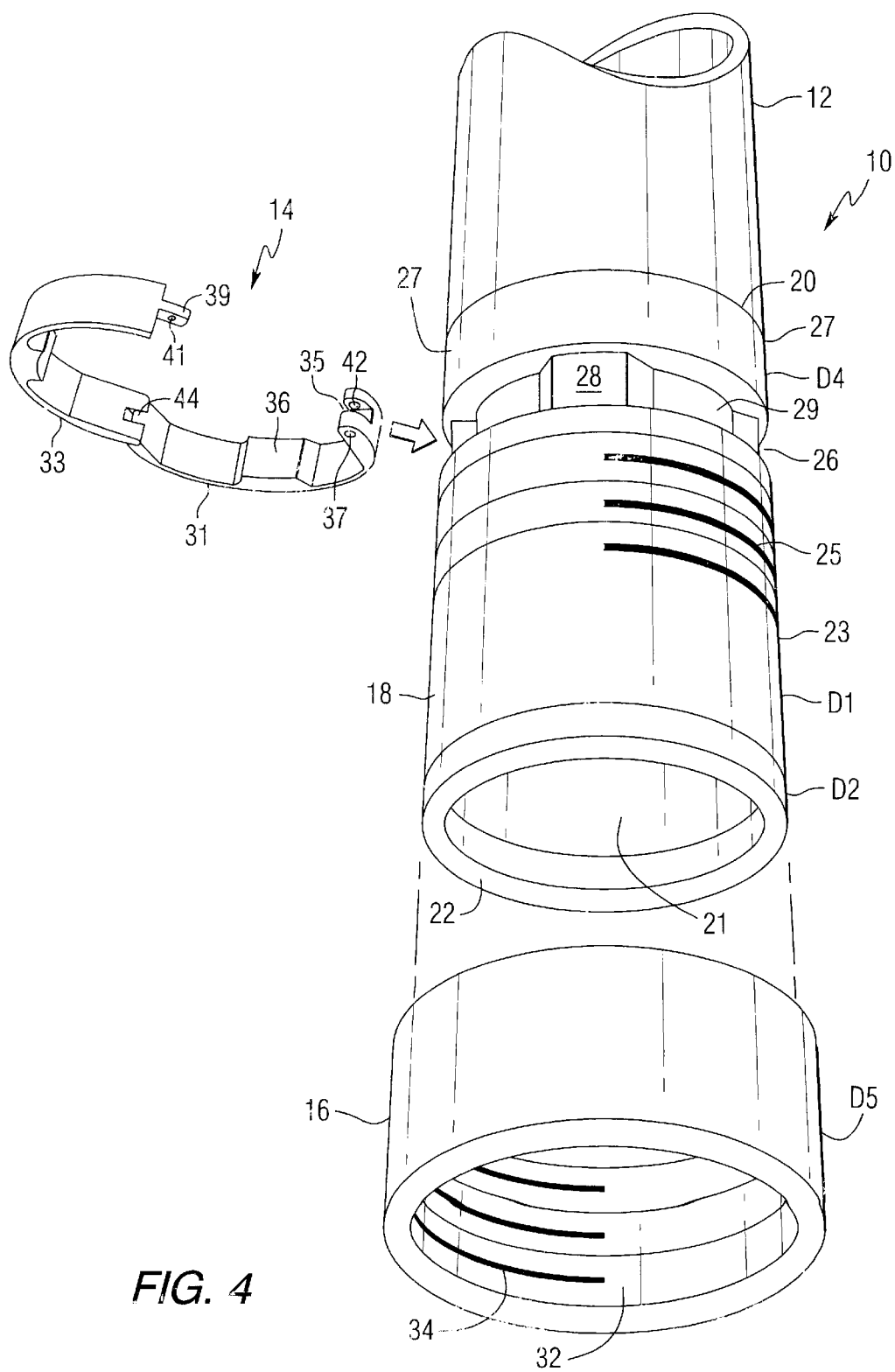
FIG. 4 shows an assembly view of a locking sleeve, protective sleeve and clip assembly formed in accordance with the teachings of this invention.
Figure 5:
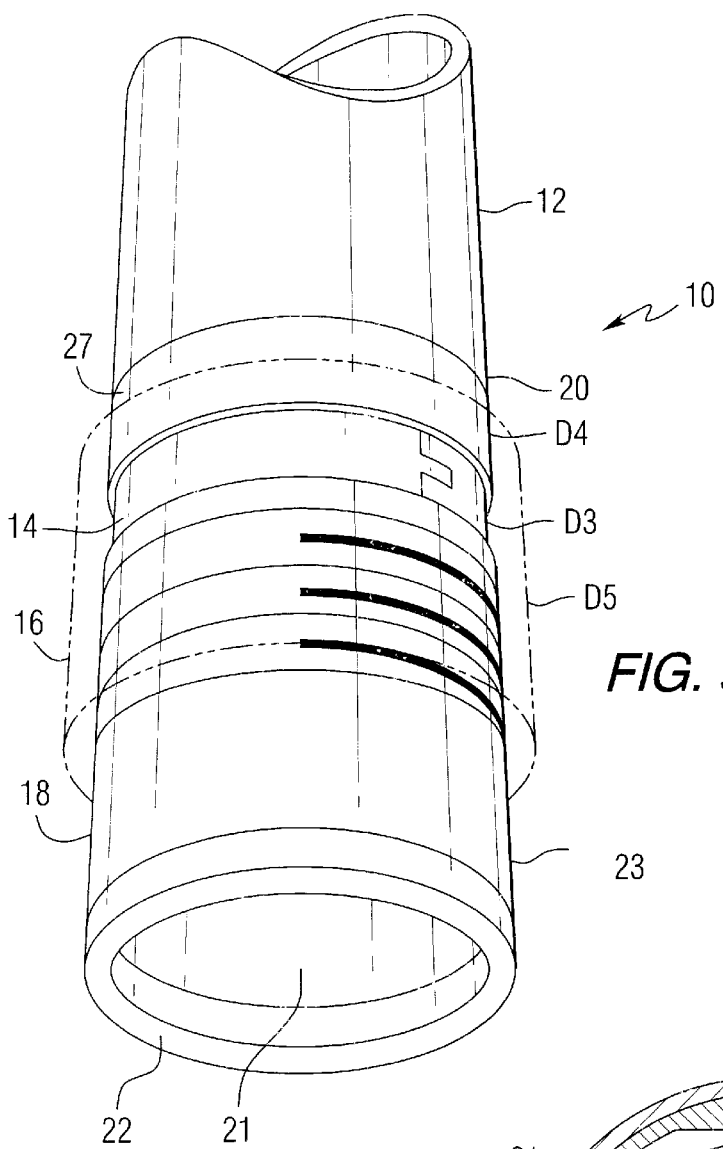
FIG. 5 shows the locking sleeve shown in FIG. 4 in position over the protective sleeve shown in FIG. 4.
Figure 6:
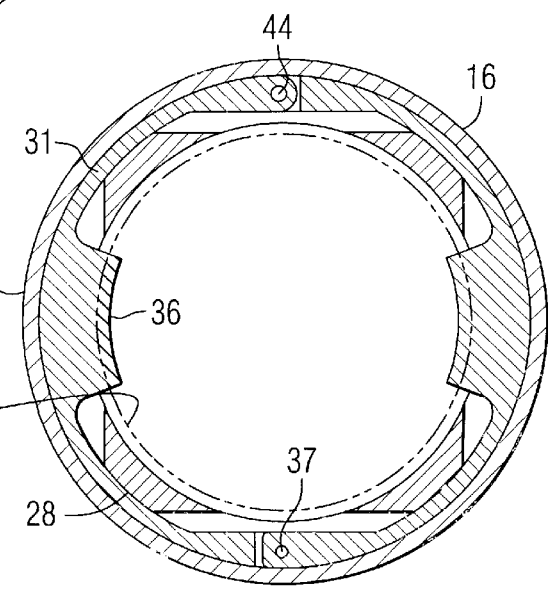
FIG. 6 shows a cross section view of the locking sleeve, protective sleeve and the clip assembly shown in FIG. 4.

As best seen in FIGS. 4 and 6, the clip 14 is a two-piece member comprising two legs 31, 33, wherein each leg 31, 33 has a semi-circular configuration. A hinge 44 couples the legs 31, 33 together at one end. At the opposite end, the legs 31, 33 are releasably fastened together.

The leg 31 is configured having a U-shaped surface 35 at the end opposite the hinge 44. Each extension of the U-shape defines an aperture 37 that supports a spring-loaded ball 42. Each spring loaded ball 42 is retained in the respective aperture by a mechanical fastener such as a screw. The spring-loaded ball 42 is supported in the aperture 37 such that a portion of the spring-loaded ball 42 extends into the opening between the extensions of the U-shape portion 35.

The leg 33, at the end opposite the hinge 44, supports a laterally extending protrusion 39. The protrusion 39 is adapted to be received in the opening between the extensions of the U-shaped portion of leg 31. The protrusion of leg 33 defines a through opening 41 for receiving a portion of each spring-loaded ball 42.

When the free ends of the legs 31, 33 are coupled together, the protrusion of the leg 33 is received in the opening between the extensions of the U-shape portion 35. The protrusion 39 contacts the spring-loaded balls 42, compressing the spring supporting each ball 42 and forcing the balls 42 into the respective aperture 37 of the U-shape extension 35. Once the opening 41 in the protrusion becomes aligned with the respective apertures 37 supporting the spring-loaded balls 42, the spring is decompressed and a portion of each ball 42 drops into the aperture 41 defined by the protrusion 39.

The free ends of the legs 31, 33 may be disengaged by causing the protrusion 39 to move in a manner that causes misalignment of the apertures 37, 41. This may occur by inserting a sharp object into the gap between the end of the protrusion 39 and the edge of the opening between the U-shaped portion 35.

Each leg 31, 33 also supports an inwardly projecting raised surface 36. The top portion of the raised surface 36 is contoured to permit engagement in an annular groove (not shown) in the outer periphery of the CET column 6. In the preferred embodiment, the top surface of the raised surface 36 is concavely shaped.

It will be clear to the ordinarily skilled artisan that the above clip 14 description is only one embodiment of many that can be designed and utilized with the locking device 10 of the present embodiment. The present invention is not limited to the specified configuration.

INSTALLATION OF THE PREFERRED EMBODIMENT

The locking device 10 is installed on the CET column 6 by inserting the protective sleeve 12 over the instrumentation leads 7 and onto the CET column 6 such that the annular groove 26 of the protective sleeve 12 aligns with an annular groove (not shown) on the outer periphery of the CET column 6. The clip 14 is then placed in the annular groove 26 of the protective sleeve 12.

The raised surfaces 36 of the legs 31, 33 are received in the apertures 29 defined by the annular groove 26, wherein the raised portions 36 extend through the apertures 29 and abut the unshown annular groove in outer periphery of the CET column 6. This arrangement of the raised surfaces 36 in the apertures 29 also helps prevent the clip 14 from rotating once installed. It will be appreciated that the protective sleeve 12 may require vertical adjustment to permit the raised surfaces 36 to align properly with the unshown annular groove in the CET column 6.

Additionally, in the preferred embodiment, the apertures 29 are spaced equidistant around the annular groove 26 in a manner that permits the raised surfaces 36 to be received therein in any of a plurality of orientations that allows the engagement of the legs 31, 33. The clip 14, when installed, is slightly recessed in the annular groove 26 as compared to D4 and D5, as shown in FIG. 6, and the free end of the legs 31, 33 are joined in the manner described above.

Figure 3A:
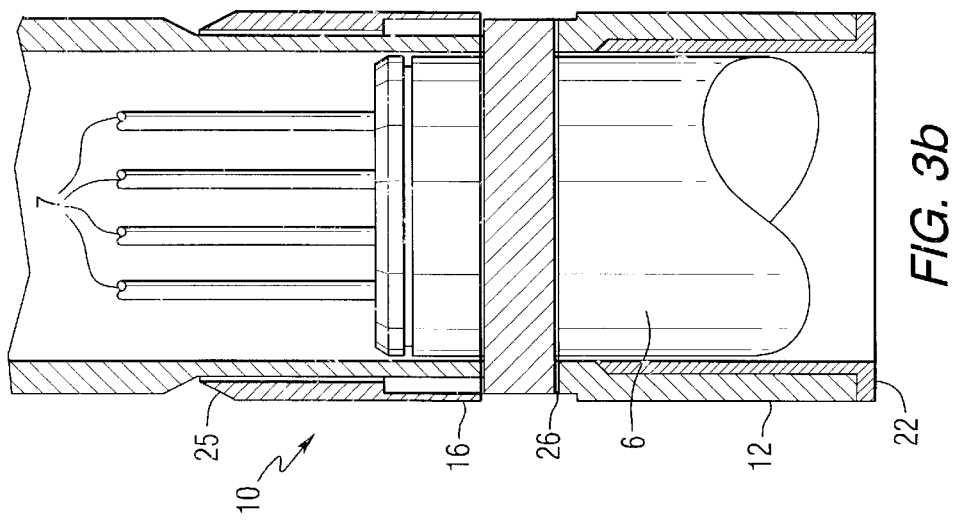
FIGS. 3a and 3b show an alternative embodiment of the positive locking device, in the locked and unlocked positions, respectively.
Figure 3B:
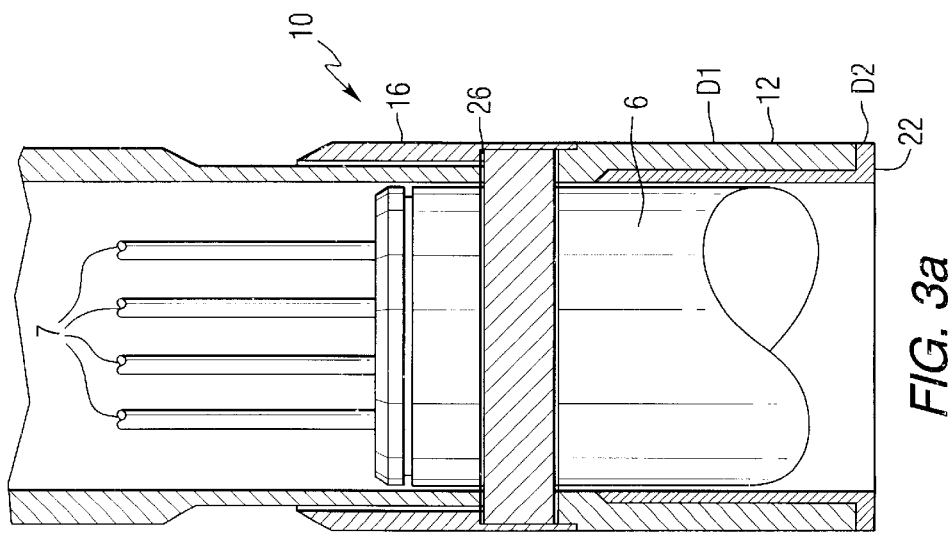

The locking sleeve 16 is then threaded onto the protective sleeve 12. As shown in the preferred embodiment of FIGS. 2a and 2b, the locking sleeve 16 may be threaded up on the protective sleeve 12 so as to cover the clip 14. It will be appreciated that the locking sleeve 16 may be threaded down on the protective sleeve 12 to cover the clip 14 as shown in FIGS. 3a and 3b. As noted earlier, the diameters D4 and D5 are substantially equal to provide a smooth transition. This ensures that the protective sleeve 12 will not interfere with the reactor closure head during assembly and/or reassembly. The skilled artisan will appreciate that diameters D4 and D5 need not be substantially equal if the sleeve 12 and locking device 10 are being used in an application that does not require a smooth transition.

The above-described embodiment provides a locking device that permits installation of a protective sleeve and a clip assembly in a plurality of configurations over a reactor CET column. However, the device can be used in any field of technology requiring the protection of various instrumentation leads from mechanical damage.

There are a variety of configurations that may be employed to fabricate the locking device 10. The disclosed embodiment is given to solely to illustrate the preferred embodiments of the invention. However, the disclosed embodiment is not intended to limit the scope and spirit of the invention. Therefore, the invention should be limited only by the appended claims.

I claim:

1. A device for protecting electrical wiring exiting an instrumentation enclosure, comprising:

a sleeve assembly including a set of threads on an external portion and an annular groove in an outer periphery thereof, said annular groove including a plurality of apertures therethrough;

a removable clip assembly being dimensioned so as to be insertable into said annular groove, said clip assembly having a plurality of projecting surfaces being dimensioned so as to be insertable into said apertures; and a cover assembly movably supported on said sleeve assembly and being dimensioned so as to cover at least a portion of said clip assembly, said cover assembly including a set of threads having a pitch identical to said sleeve assembly threads on an internal portion of thereof, wherein rotating said cover assembly moves said cover assembly on said sleeve assembly to cover and uncover said clip assembly.

* * * * *